US007900085B2

(12) United States Patent
Little (10) Patent No.: US 7,900,085 B2
(45) Date of Patent: Mar. 1, 2011

(54) BACKUP COORDINATOR FOR DISTRIBUTED TRANSACTIONS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 328 days.

(21) Appl. No.: 12/129,665

(22) Filed: May 29, 2008

(65) Prior Publication Data

US 2009/0300405 A1 Dec. 3, 2009

(51) Int. Cl.
*G06F 11/00* (2006.01)

(52) U.S. Cl. ............... 714/10; 714/4; 714/19; 714/20

(58) Field of Classification Search ........................ None
See application file for complete search history.

(56) References Cited

U.S. PATENT DOCUMENTS

| 6,738,971 | B2 | | 5/2004 | Chandrasekaran et al. | |
|---|---|---|---|---|---|
| 6,785,696 | B2 | | 8/2004 | Mosher, Jr. et al. | |
| 7,152,181 | B2 | * | 12/2006 | Fung et al. | 714/4 |
| 7,536,581 | B2 | * | 5/2009 | Fiske | 714/4 |
| 7,620,842 | B2 | * | 11/2009 | Fung et al. | 714/4 |

OTHER PUBLICATIONS

Abdallah, Maha, et al., "One-Phase Commit: Does it Make Sense?", Lab. PRiSM, Univ. de Versailles, 11 pages, Dec. 14-16, 1998 ISBN 0818686030.
Lampson, Butler, et al. "A New Presumed Commit Optimization for Two Phase Commit", Feb. 10, 1993, CRL 93/1, Digital Equipment Corporation, Cambridge Research Laboratory Technical Report Series. Copyright Digital Equipment Corporation 1993, 26 pages.
Samaras, George, et al., "Two-Phase Commit Optimization and Tradeoffs in the Commercial Environment", 1063-6382/93, Copyright 1993 IEEE, pp. 520-529.
Abdallah, M., et al., "One-phase commit: does it make sense?", Parallel and Distributed Systems, 1998, Proceedings, 1998 International Conference , Dec. 14-16, 1998 pp. 182-192.
"JBoss Transactions 4.2.3, JTS Programmers Guide", © 2006, 117 pages.
Johnson, Rod, et al., "Spring java/j2ee Application Framework, The Spring Framework—Reference Documentation", Version 2.5.6, © 2004-2008, 590 pages.
Lampson, Butler and Lomet, David, "A New Presumed Commit Optimization for Two Phase Commit", Cambridge Research Laboratory, Technical Report Series, Feb. 10, 1993, 26 pages.
Samaras, George, et al., "Two-Phase Commit Optimizations and Tradeoffs in the Commercial Environment", IBM Distributed Systems Architecture, IBM Almaden Research Center, pp. 520-529.

(Continued)

*Primary Examiner* — Michael C Maskulinski
(74) *Attorney, Agent, or Firm* — Blakely, Sokoloff, Taylor & Zafman LLP (57) ABSTRACT

A primary coordinator generates a prepare message for a two-phase commit distributed transaction, the prepare message including an address of a backup coordinator. The primary coordinator maintains a transaction log of the distributed transaction, wherein the transaction log is accessible to both the primary coordinator and the backup coordinator. The prepare message is sent to a plurality of participants. The primary coordinator fails over to the backup coordinator without interrupting the distributed transaction.

22 Claims, 7 Drawing Sheets

OTHER PUBLICATIONS

Little, M. C., et al., "A method for combining replication with cacheing" Oct. 1999, 7 pages, appeared in proceedings of the International Workshop on Reliable Middleware Systems, Lausanne, Switzerland.

* cited by examiner

BACKUP COORDINATOR FOR DISTRIBUTED TRANSACTIONS

TECHNICAL FIELD

Embodiments of the present invention relate to distributed transactions, and more specifically to improving reliability of distributed transaction recovery.

BACKGROUND

Distributed transactions are often performed on distributed computing systems. A distributed transaction is a set of operations that update shared objects. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared objects. The Isolation property requires that intermediate effects of the transaction are not detectable to concurrent transactions. Finally, the Durability property requires that changes to shared objects due to the transaction are permanent.

To ensure the Atomicity property, all participants of the distributed transaction must coordinate their actions so that they either unanimously abort or unanimously commit to the transaction. A two-phase commit protocol is commonly used to ensure Atomicity. Under the two-phase commit protocol, the distributed system performs the commit operation in two phases. In the first phase, commonly known as the prepare phase or request phase, a coordinator node (a node in the distributed computing system managing the transaction) asks all participant nodes whether they are willing to commit to the transaction. During the second phase, commonly known as the commit phase, the coordinator node determines whether the transaction should be completed. If during the prepare phase all participant nodes committed to the transaction, the coordinator node successfully completes the transaction. If during the prepare phase one or more participant nodes failed to commit to the transaction, the coordinator node does not complete the transaction.

Typically, only the coordinator node has all the information necessary to determine whether a transaction should commit or roll back. Therefore, if the coordinator node fails during a distributed transaction, all participants in the transaction must wait for the coordinator to recover before completing the transaction. Thus, significant delays may be caused when a coordinator fails.

To minimize delays caused by a failed coordinator, some conventional transaction systems use clustering and/or group communication protocols to provide standby coordinators. However, clustering protocols and group communication protocols add complexity to distributed transactions, and require a change to the underlying distributed transaction protocol.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for performing distributed transactions. In one embodiment, a primary coordinator generates a prepare message for a two-phase commit distributed transaction. The prepare message includes an address of a backup coordinator. The primary coordinator maintains a transaction log of the distributed transaction that is accessible to both the primary coordinator and the backup coordinator. The prepare message is sent to a plurality of participants. The backup coordinator may assume control of the distributed transaction at any time if the primary coordinator fails. In one embodiment, the backup coordinator and the primary coordinator exchange a heartbeat message. If the primary coordinator fails to respond to the heartbeat message, the backup coordinator can assume control of the distributed transaction. In one embodiment, the backup coordinator assumes control of the distributed transaction upon receiving a status inquiry message from a participant of the distributed transaction. Failover of the primary coordinator to the backup coordinator can occur in a seamless manner without interrupting the distributed transaction.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "managing", "directing", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
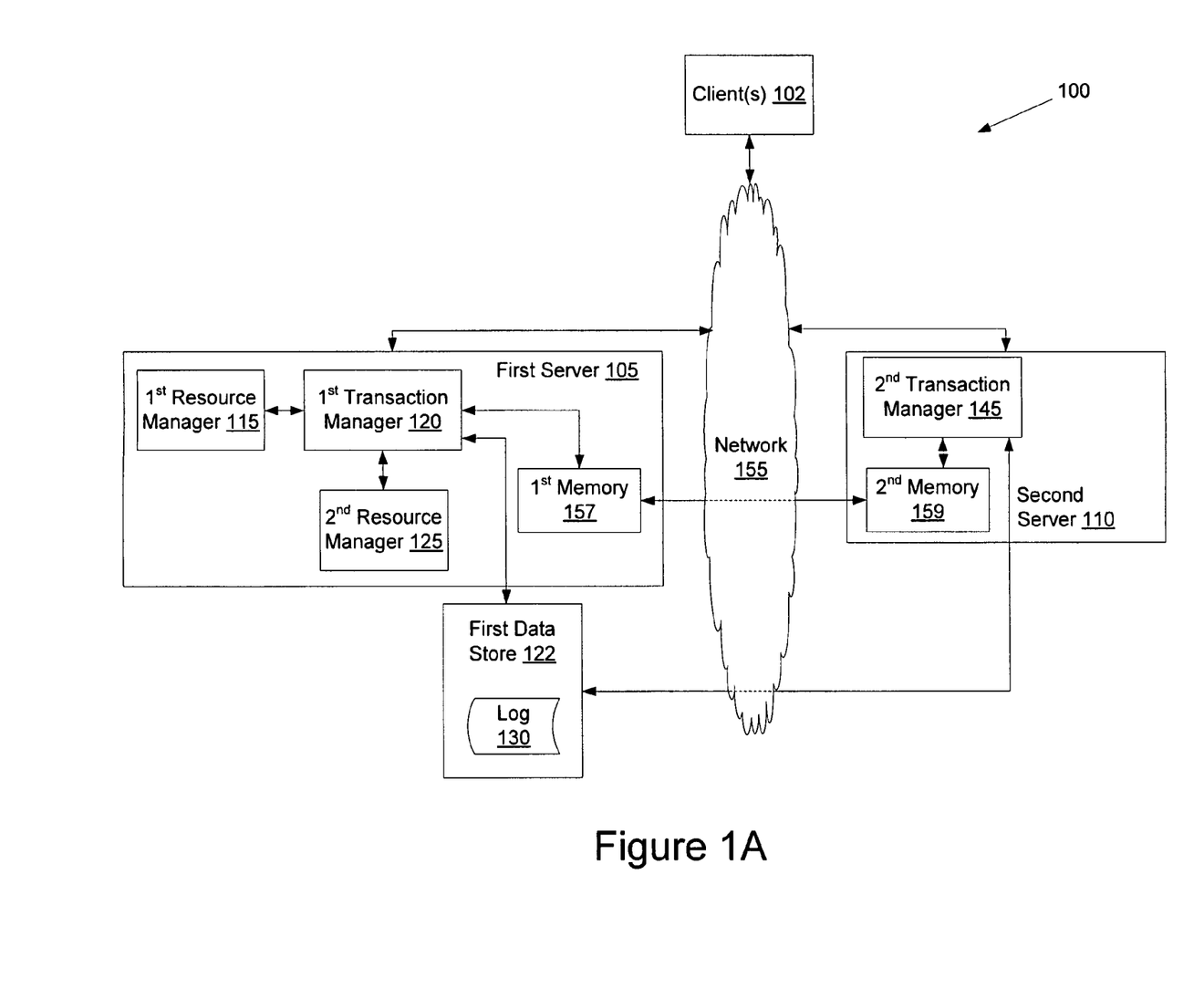
FIG. 1A illustrates an exemplary distributed computing system, in which embodiments of the present invention may operate.

FIG. 1A illustrates an exemplary distributed computing system 100, in which embodiments of the present invention may operate. The distributed computing system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services. In one embodiment, the distributed computing system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In one embodiment, the distributed computing system 100 includes one or more clients 102, a first server 105 and a second server 110 connected via a network 155. Alternatively, the distributed computing system 100 may only include a single server and/or the client 102 may be directly connected with the first server 105 or the second server 110.

Client(s) 102 may be, for example, personal computers (PC), palm-sized computing devices, personal digital assistants (PDA), etc. Client(s) 102 may also be applications run on a PC, server, database, etc. In the SOA, client(s) 102 include applications that access services. Client(s) 102 may be fat clients (client that performs local processing and data storage), thin clients (client that performs minimal or no local processing and minimal to no data storage), and/or hybrid clients (client that performs local processing but little to no data storage).

Each of the first server 105 and second server 110 may host services, applications and/or other functionality that is available to clients 102 on the distributed computing system 100. The first server 105 and second server 110 may be a single machine, or may include multiple interconnected machines (e.g., machines configured in a cluster). The network 155 may be a private network (e.g., local area network (LAN), wide area network (WAN), intranet, etc.), a public network (e.g., the Internet), or a combination thereof.

In one embodiment, first server 105 includes a first resource manager 115 and a second resource manager 125. A resource manager is a software module that manages a persistent and stable storage system. Examples of resource managers include databases and file managers.

In one embodiment, first server 105 is coupled with one or more data stores on which first resource manager 115 and second resource manager 125 maintain transaction logs. In one embodiment, the transactions logs are maintained on data store 122. Alternatively, the transaction logs may be maintained on a different data store or data stores. The data store(s) may include a file system, a database, or other data storage arrangement, and may be internal or external to first server 105. The transaction logs maintained by first resource manager 115 and second resource manager 125 may be undo logs (log of committed changes that occur during a distributed transaction) and/or redo logs (log of uncommitted changes that occur during a distributed transaction). The redo logs and/or undo logs can be used to rollback any changes that occurred during a distributed transaction if the transaction is aborted.

Each resource manager that participates in a distributed transaction may be a participant node of the transaction. During a prepare phase of a two-phase commit distributed transaction, a participant node is asked whether it can commit to the transaction by a coordinator node (described in greater detail below). If the resource manager can commit to the transaction, it sends a commit response to the coordinator node. If the resource manager cannot commit to the transaction, it sends an abort message to the coordinator node.

During a commit phase of a two-phase commit distributed transaction, each resource manager receives a commit command if all resource managers indicated that they were able to commit. Each resource manager then commits to the transaction and sends a confirmation to the coordinator that the transaction was successfully completed. If one or more of the participating resource managers sent an abort response, then all resource managers receive an abort command during the commit phase. Each resource manager then rolls back the transaction, and may send a confirmation to the coordinator that the transaction was rolled back.

In one embodiment, the first server 105 includes a first transaction manager 120, and the second server 110 includes a second transaction manager 145. A transaction manager is a software module that coordinates multiple participants during a distributed transaction. A participant may be another transaction manager (e.g., second transaction manager 145) or a local resource manager (e.g., first resource manager 115 and second resource manager 125). Coordinating a distributed transaction may include assigning identifiers to the transaction, monitoring progress of the transaction, taking responsibility for transaction completion, and providing fault recovery for the transaction. Taking responsibility for transaction completion may include determining whether each participant can commit to a transaction, directing each participant to commit if all are able, and directing each participant to rollback if not all participating nodes are able to commit. Providing fault recovery may include maintaining a log of transactions that can be used by participants to recover from a system failure.

Any transaction manager in the distributed computing system 100 is capable of operating as a coordinator node. Generally, it is a transaction manager that is located at a node at which a transaction is begun or requested that operates as the coordinator node for that distributed transaction. However, it is not a requirement that a node that begins a transaction act as coordinator node for that transaction. Moreover, a transaction manager can hand responsibility over to another node, causing a transaction manager of that other node to become the coordinator node.

In one embodiment, first transaction manager 120 acts as a master coordinator node, and coordinates a distributed transaction between first resource manager 115, second resource manager 125 and/or one or more remote transaction managers and resource managers. A master coordinator node is a transaction manager that acts on behalf of a process that initiates a distributed transaction (e.g., by initiating a commit operation) to coordinate all participants of the distributed transaction. A master coordinator node must arrive at a commit or abort decision and propagate that decision to all participants. In one embodiment, first transaction manager 120 is configured to initiate a two-phase commit distributed transaction if there are multiple resource managers and/or transaction managers that will participate in the transaction.

In another embodiment, first transaction manager 120 may act as an intermediate coordinator node, and coordinate a distributed transaction between only first resource manager 115 and second resource manager 125. An intermediate coordinator node is a transaction manager that acts on behalf of a process that participates in a distributed transaction to coordinate local resource managers and/or additional transaction managers that are participants in the distributed transaction. An intermediate coordinator node gathers information about the participants that it manages, and reports the information to a master coordinator node. An intermediate coordinator node also receives commit or abort decisions from a master coordinator node, and propagates the decisions to participants that it manages.

In one embodiment, first transaction manager 120 acts as a primary coordinator node and second transaction manager 145 acts as a backup coordinator node. As a primary coordinator node, first transaction manager 120 coordinates a transaction until a failure occurs. If the first transaction manager 120 fails, the second transaction manager 145 (acting as backup coordinator node) assumes control of the transaction.

During a prepare phase of a two-phase distributed transaction, first transaction manager 120 notifies all participants that second transaction manager 145 will act as a backup coordinator node. In one embodiment, first transaction manager 120 performs this notification by inserting an address of the second transaction manager 145 into a prepare message that is sent to all participants. Participants may then use the address of second transaction manager 145 to inquire about a status of the transaction if communication with first transaction manager 120 is lost.

In one embodiment, first transaction manager 120 and second transaction manager 145 exchange heartbeat messages at regular intervals. The heartbeat messages are used to inform each transaction manager of the other transaction manager's operating status. If, for example, second transaction manager 145 fails to receive a heartbeat message from first transaction manager 120, second transaction manager 145 may determine that first transaction manager 120 has failed. Second transaction manager 145 may then assume control of any transaction coordinated by first transaction manager 120.

In one embodiment, first server 105 is connected with a data store 122. Data store 122 may include a file system, a database, or other data storage arrangement. In one embodiment, data store 122 is internal to first server 105. In another embodiment, data store 122 may be external to first server 105, and connected with first server 105 either directly or via a network. In yet another embodiment, data store 122 is a shared data store that can be read from and written to by both first transaction manager 120 and second transaction manager 145.

In one embodiment, first transaction manager 120 maintains a transaction log 130 of active transactions in the data store 122. The first transaction manager 120 may operate using the presumed nothing, presumed commit or presumed abort optimizations. In the presumed nothing optimization, information about a transaction is maintained in the transaction log 130 until all participants acknowledge an outcome of the transaction whether the transaction is to be committed or aborted (rolled back). According to the presumed abort optimization the first transaction manager 120 only maintains information about a transaction in transaction log 130 if the transaction is committed. Therefore, in the absence of information about a transaction, the first transaction manger 120 presumes that the transaction has been aborted. In the presumed commit optimization, the first transaction manager 120 maintains records of aborted transactions. In the absence of information about a transaction the transaction manager 120 presumes that the transaction was successfully completed.

In one embodiment, first transaction manager 130 maintains an entry in the transaction log 130 for each participant of a specified transaction. As the first transaction manager 120 receives confirmation from participants that they successfully committed or rolled back the transaction, it may remove the entry corresponding to that participant from the transaction log 130. Once the first transaction manager 120 receives messages from all participants indicating that they have successfully committed or rolled back the transaction, first transaction manager 120 deletes the log corresponding to that transaction. This minimizes the amount of storage capacity of data store 122 that is required to maintain the transaction log 130.

To successfully perform its role as a backup coordinator, second transaction manager 145 has access to a transaction log 130 maintained by first transaction manager 120. Therefore, second transaction manager 145 can direct participants of a distributed transaction managed by first transaction manager 120 whether the transaction was committed or rolled back if first transaction manager 120 fails. In the absence of a backup coordinator, participants of the transaction would have to wait for first transaction manager 120 to recover from its failure before the participants can resolve the transaction. This can cause considerable delay in some distributed computing systems.

In one embodiment, failures of the primary coordinator are only tolerated after the transaction log 130 is written to. This ensures that the atomicity property required for distributed transactions is achieved. However, in such an embodiment if a failure in the first transaction manager 120 occurs prior to the first transaction manager 120 writing to transaction log 130, the second transaction manager 145 directs all participants to roll back the transaction. Such a system design requires a minimum of resources at the expense of occasionally rolling back transactions that would otherwise have been successful if the first transaction manager 120 had not failed. Such a system design may be preferable for systems that have very low failure rates.

First server 105 includes a first memory 157 and second server 110 includes a second memory 159. In one embodiment, first memory 157 and second memory 159 are components of a shared memory. In one embodiment, the first memory 157 and second memory 159 are volatile memories (e.g., random access memory (RAM)) that are components of a shared backplane bus. In such an embodiment, the first server and second server are networked via a local area network. In another embodiment, first memory 157 and second memory 159 are components of a shared file system that includes a memory mapped file (not shown). The memory mapped file may be a file that includes all the relevant information pertaining to a distributed transaction that is resident in volatile memory of first transaction manager 120. In yet another embodiment, first memory 157 and second memory 159 are components of a shared virtual memory. In still another embodiment, second transaction manager 145 is a replicated service of first transaction manager 120 that maintains volatile information only in memory.

A shared memory between first transaction manager 120 and second transaction manager 145 permits a distributed transaction to be assumed by second transaction manager 145 whether or not first transaction manager 120 has written to transaction log 130. Therefore, for example, if first transaction manager 120 fails after sending out prepare messages, and before receiving commit or rollback responses from all participants, second transaction manager 145 may determine which participants have not yet responded. Second transaction manager 145 may then complete the transaction by receiving commit or rollback messages from the remaining participants, and issuing a commit or rollback command to all participants.

Figure 1B:
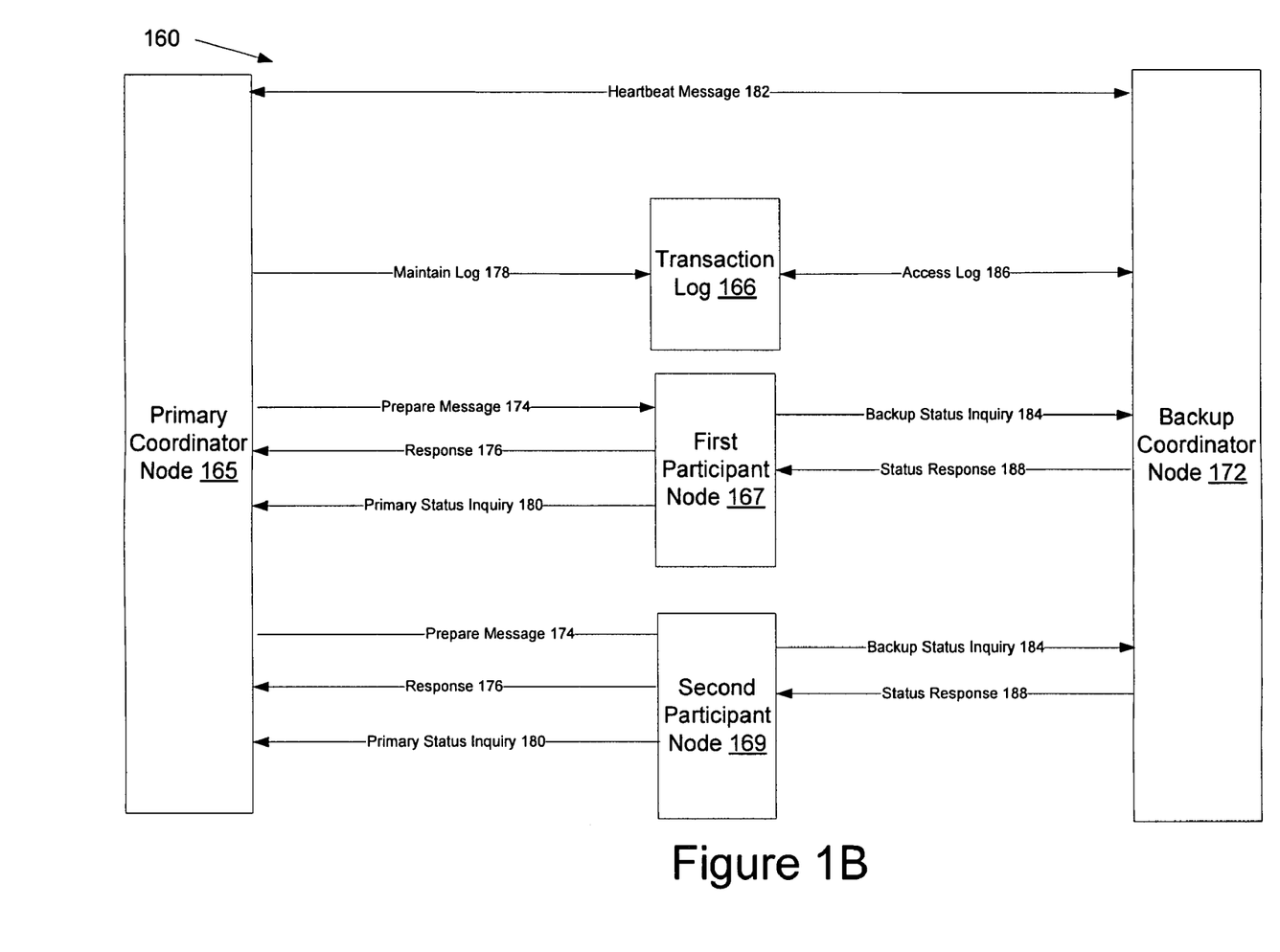
FIG. 1B is a transaction diagram illustrating messages flowing through a distributed computing system, in accordance with one embodiment of the present invention.

FIG. 1B is a transaction diagram illustrating messages flowing through a distributed computing system 160, in accordance with one embodiment of the present invention. In one embodiment, the distributed computing system 160 includes a primary coordinator node 165, a backup coordinator node 172, a transaction log 166 and multiple participant nodes (e.g., first participant node 167 and second participant node 169). Each node represents a specific resource manager or transaction manager that participates in a distributed transaction. Each node is connected with each other node directly or via a network, which may be a private network (e.g., local area network (LAN), wide area network (WAN), intranet, etc.), a public network (e.g., the Internet), or a combination thereof.

In one embodiment, primary coordinator node 165 includes a first transaction manager that initiates and manages a specific distributed transaction, and backup coordinator node 172 includes a second transaction manager that assumes management of the specific distributed transaction if primary coordinator node 165 fails. Managing the distributed transaction includes determining whether each participating node 167, 169 can commit to a transaction, directing each participating node 167, 169 to commit if all are able, and directing each participating node 167, 169 to rollback (undo changes caused by the transaction) if not all participating nodes are able to commit.

In one embodiment, the primary coordinator node 165 coordinates a two-phase commit distributed transaction between the first participant node 167 and the second participant node 169. During a prepare phase of the two-phase commit distributed transaction, the primary coordinator node 165 sends a prepare message 174 to each of the participant nodes 167, 169 asking whether they can commit to the transaction. The prepare message 174 may identify the primary coordinator node, the participant nodes, and the distributed transaction. The prepare message 174 may also include an address of the backup coordinator node 172, thereby notifying the participant nodes 167, 169 how to contact the backup coordinator node 172 if the primary coordinator node 165 fails. The primary coordinator node 165 then waits for a response from each of the participant nodes 167, 169.

Each participant node 167, 169 then sends a response 176 (e.g., a commit response or an abort response) to the primary coordinator node 165 responding to the prepare message 174. The participant nodes 167, 169 will then wait for a commit or roll-back (abort) command from the primary coordinator 165. If no commit or roll-back command is received within a specified time frame, the first participant node 167 and second participant node 169 send a primary status inquiry message 180 to the primary coordinator node 165. The primary status inquiry message 180 requests an outcome of the distributed transaction. If no response to the primary status inquiry message 180 is received in another specified time frame, the first participant node 167 and second participant node 169 send a backup status inquiry message 184 to the backup coordinator node 172 (e.g., using the address provided in the prepare message 174).

Upon receiving a backup status inquiry message 184, backup coordinator node 172 may assume control of the distributed transaction. Alternatively, or in addition, backup coordinator node 172 may exchange heartbeat messages 182 with primary coordinator node 165. If primary coordinator node 165 fails to send a heartbeat message 182 to backup coordinator node 172, backup coordinator node 172 may assume control of the distributed transaction.

Upon assuming control of the distributed transaction, backup coordinator node 172 accesses transaction log 166, which was maintained 178 by primary coordinator node 165 until primary coordinator node 165 failed. The transaction log 166 may have varying degrees of information, depending on a two-phase commit optimization used by the distributed computing system 160 and/or depending on a stage of the transaction. For example, if a presumed abort optimization is used, primary coordinator node 165 may only have written to transaction log 166 if it received commit response messages 176 from both first participant 167 and second participant 169. If, for example, a presumed nothing optimization or presumed commit optimization is used, the transaction log 166 may include an entry for the distributed transaction even if primary coordinator node 165 failed before receiving response messages 176. In one embodiment, the distributed computing system 160 includes a shared memory between primary coordinator node 165 and backup coordinator node 172. The shared memory may provide backup coordinator node 172 with all information pertaining to the distributed transaction that was stored in volatile memory of primary coordinator node 165. Therefore, backup coordinator node 172 may have more information available to it from which to base a commit or abort decision than what is stored in the transaction log 166.

After receiving the backup status inquiry message 184, backup coordinator 172 may send a status response 188 to first participant 167 and second participant 169 notifying them of a status of the transaction. If backup coordinator node 172 does not have enough information from which to base an abort or commit decision, it may include in the status response 188 a request to identify whether the participant nodes 167, 169 had responded to the prepare message 174 with a commit or abort response. Upon receiving the updated responses, backup coordinator node 172 may then command the participant nodes 167, 169 to commit or roll back the transaction, as appropriate. Alternatively, if there is not enough information available, backup coordinator node 172 may command first participant node 167 and second participant node 169 to roll back the transaction via the status response 188. If there is enough information, backup coordinator node 172 may include a commit or abort command as appropriate in the status response 188.

Though FIG. 1B has been described with two participant nodes, embodiments of the present invention work equally well for distributed transactions that include greater or fewer than two participant nodes. Moreover, though a single backup coordinator 172 has been described, embodiments of the present invention operate equally well with multiple backup coordinators. In such embodiments, the multiple backup coordinators are ranked. That way there is no confusion as to which backup coordinator node is to assume control of the distributed transaction when the primary coordinator node or another backup coordinator node fails.

Figure 2:
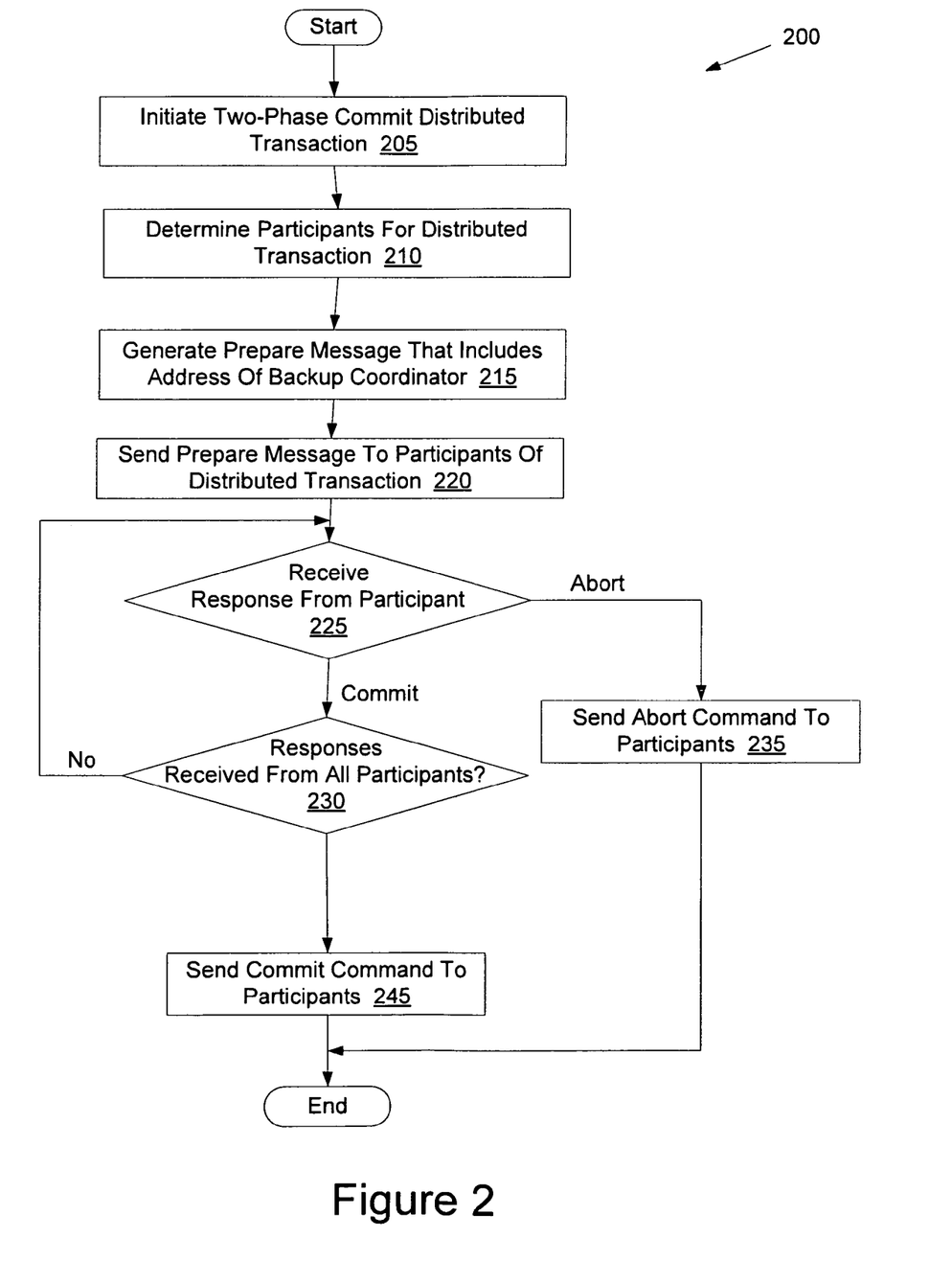
FIG. 2 illustrates a flow diagram of one embodiment for a method of coordinating a two-phase commit distributed transaction.

FIG. 2 illustrates a flow diagram of one embodiment for a method 200 of coordinating a two-phase commit distributed transaction. The method is performed by processing logic that comprises hardware (e.g., circuitry, dedicated logic, programmable logic, microcode, etc.), software (such as instructions run on a processing device), or a combination thereof. In one embodiment, method 200 is performed by a transaction manager (e.g., first transaction manager 120) of FIG. 1A acting as a primary coordinator node.

Referring to FIG. 2, method 200 includes initiating a two-phase commit distributed transaction (block 205) by a primary coordinator node. At block 210, participants for the distributed transaction are determined. Appropriate participants include resource managers that will contribute data or services to the transaction and/or transaction managers that manage those resource managers. Appropriate participants may be determined by broadcasting a transaction participation query, and receiving responses from all nodes that will participate in the queried transaction. Alternatively, appropriate participants may be determined, for example, based on a nature of the transaction, an initiator of the transaction, or other criteria.

At block 215, a prepare message is generated that includes an address of a backup coordinator. In one embodiment, the backup coordinator is a transaction manager that remains in a standby mode during the transaction. If the primary coordinator node fails during the transaction, the backup coordinator may assume control of the transaction. At block 220, the prepare message is sent to each of the participants of the distributed transaction.

At block 225, a response message is received from a participant. If the response message is an abort response, then the transaction will be aborted, and the method proceeds to block 235. If the response message is a commit message, the method proceeds to block 230.

At block 235, an abort command is sent to all participants.

At block 230, processing logic determines whether responses have been received from all participants. If responses have not been received from all participants, the method returns to block 225. If responses have been received from all participants, the method proceeds to block 240.

At block 240, a commit command is sent to all participants. The participants may then commit to the transaction, and send back a commit acknowledgement. Upon receiving commit acknowledgements from all participants, the primary coordinator node may close the transaction and delete all transaction logs for the transaction.

In embodiments of the present invention, the primary coordinator node writes to a transaction log at certain stages of method 200. For example, if the presumed nothing optimization is used, the primary coordinator node may write to the transaction log upon determining the participants of the transaction, after sending out the prepare messages, upon receiving each response from a participant, upon sending an abort command to the participants and/or upon sending a commit command to the participants. In another example, if the presumed abort optimization is used, the primary coordinator node may write to the transaction log upon receiving a commit response from all participants. This transaction log may then be used by the backup coordinator to complete the transaction in the event that the primary coordinator should fail.

Figure 3A:
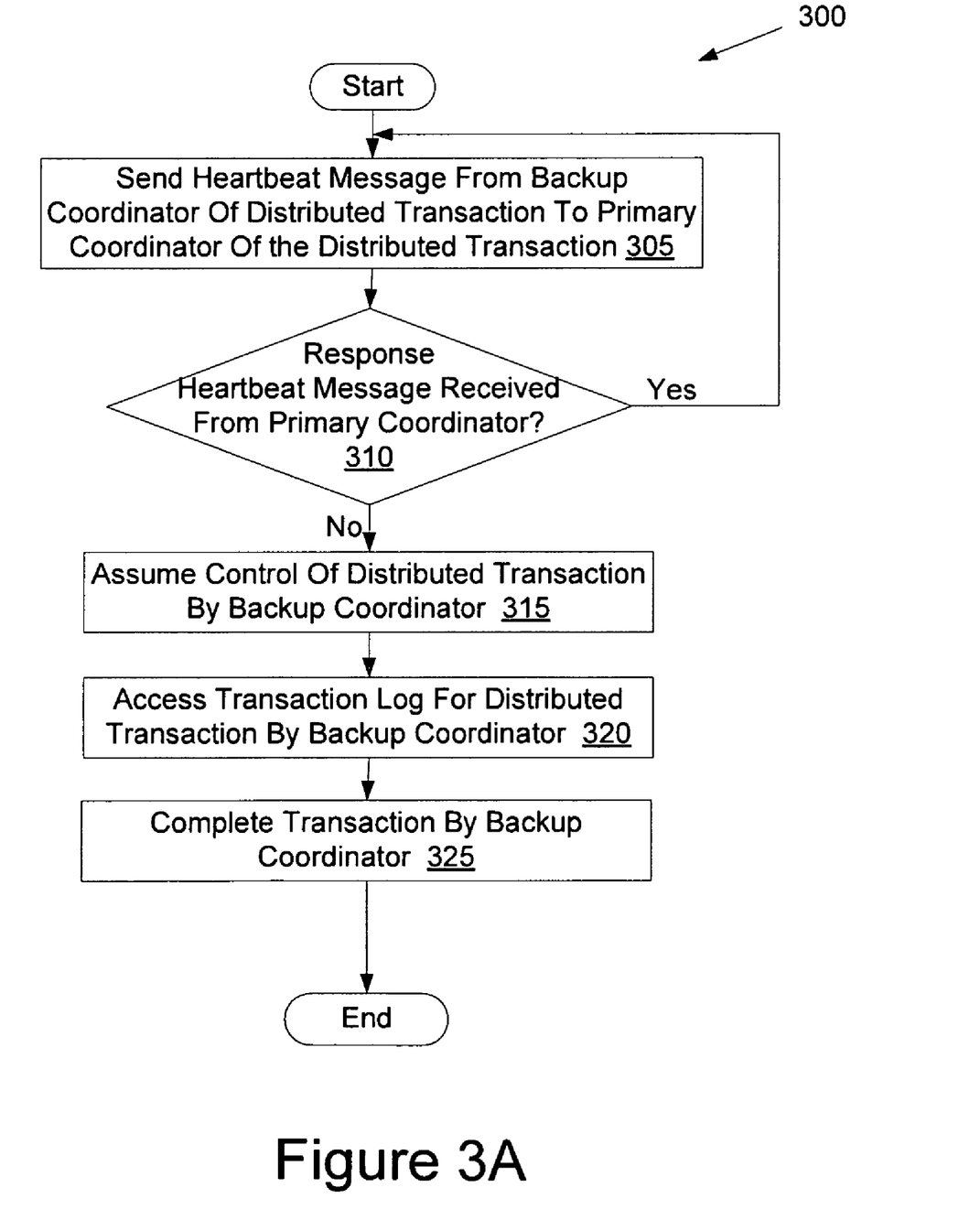
FIG. 3A illustrates a flow diagram of one embodiment for a method of assuming control of a distributed transaction by a backup coordinator.

FIG. 3A illustrates a flow diagram of one embodiment for a method 300 of assuming control of a distributed transaction by a backup coordinator. The method is performed by processing logic that comprises hardware (e.g., circuitry, dedicated logic, programmable logic, microcode, etc.), software (such as instructions run on a processing device), or a combination thereof. In one embodiment, method 300 is performed by a transaction manager (e.g., second transaction manager 145) of FIG. 1A.

Referring to FIG. 3A, method 300 includes sending a heartbeat message from the backup coordinator of a distributed transaction to a primary coordinator of the distributed transaction (block 305). At block 310, the backup coordinator waits for a response heartbeat message from the primary coordinator. If a response backup message is received from the primary coordinator, the method returns to block 305. If no response heartbeat message is received within a specified time period, the method continues to block 315.

At block 315, the backup coordinator assumes control of the distributed transaction. At block 320, the backup coordinator accesses a transaction log for the distributed transaction that was maintained by the primary coordinator. In one embodiment, the backup coordinator also has access to a shared memory that includes contents of a volatile memory of the primary coordinator prior to failure of the primary coordinator. The transaction log and/or the shared memory can be used to determine a current state of the transaction.

At block 325, the backup coordinator completes the distributed transaction. Completing the transaction may include requesting abort or commit responses from participants, sending abort or commit commands to participants, receiving acknowledgements from the participants, etc. The method then ends.

Figure 3B:
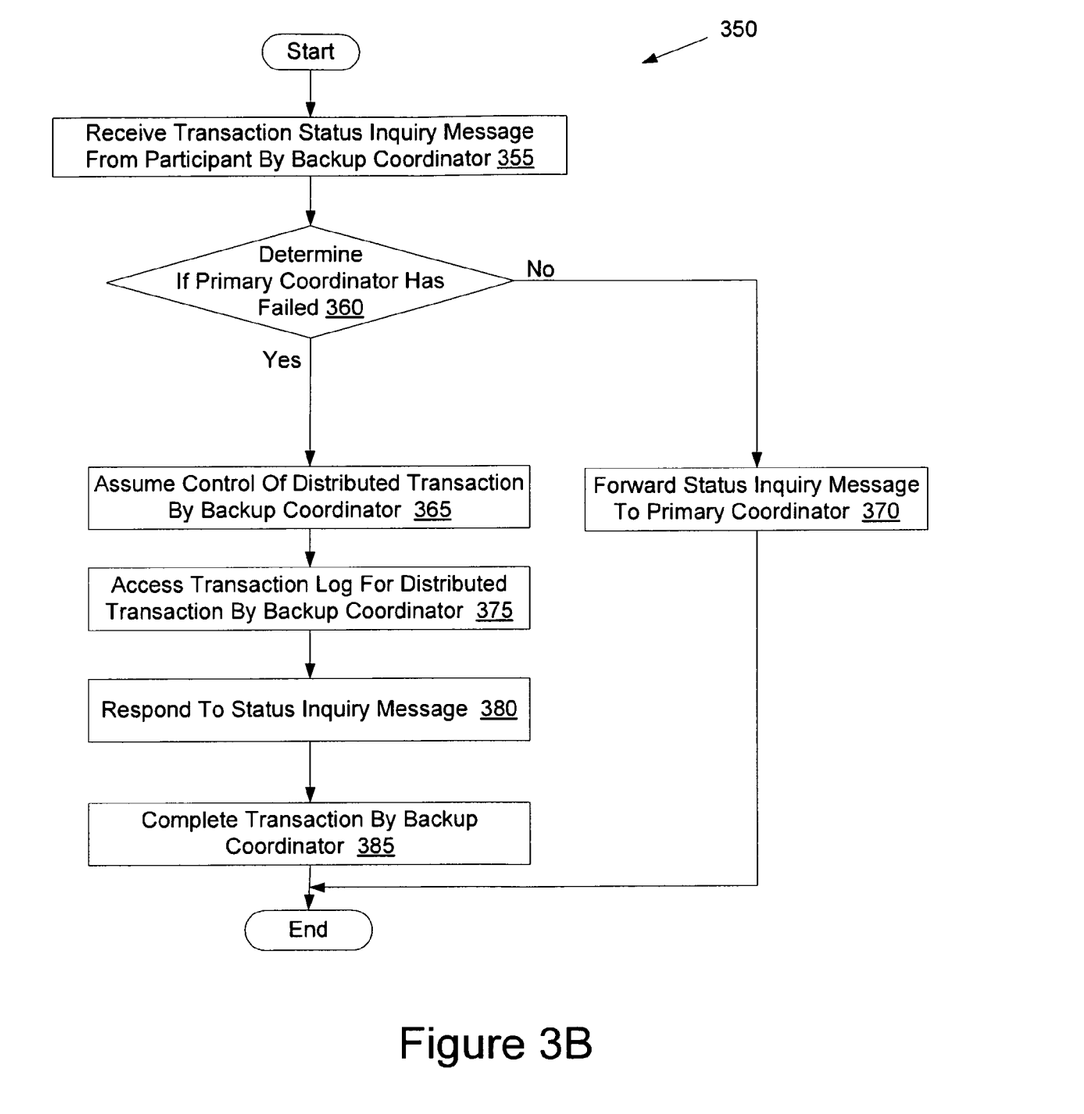
FIG. 3B illustrates a flow diagram of another embodiment for a method of assuming control of a distributed transaction by a backup coordinator.

FIG. 3B illustrates a flow diagram of another embodiment for a method 350 of assuming control of a distributed transaction by a backup coordinator. The method is performed by processing logic that comprises hardware (e.g., circuitry, dedicated logic, programmable logic, microcode, etc.), software (such as instructions run on a processing device), or a combination thereof. In one embodiment, method 350 is performed by a transaction manager (e.g., second transaction manager 145) of FIG. 1A.

Referring to FIG. 3B, method 350 includes receiving a transaction status inquiry message from a participant (block 355). The transaction status inquiry message may have been sent by a participant node after the participant node failed to receive a response to another status inquiry message sent to a primary coordinator.

At block 360, the backup coordinator determines if the primary coordinator has failed. In one embodiment, such a determination is made by sending a heartbeat message to the primary coordinator and waiting for a response heartbeat message. Alternatively, it may be automatically determined that the primary coordinator has failed based on receipt of the transaction status inquiry message by the backup coordinator. If it is determined that the primary coordinator has failed, the method continues to block 365. If it is determined that the primary coordinator has not failed, the method proceeds to block 370, and the status inquiry message is forwarded to the primary coordinator.

At block 365, the backup coordinator assumes control of the distributed transaction. At block 375, the backup coordinator accesses a transaction log for the distributed transaction that was maintained by the primary coordinator. In one embodiment, the backup coordinator also has access to a shared memory that includes contents of a volatile memory of the primary coordinator prior to failure of the primary coordinator. The transaction log and/or the shared memory can be used to determine a current state of the transaction.

At block 380, the backup coordinator responds to the status inquiry message based on the contents of the transaction log and/or the shared memory. If the transaction log and/or shared memory indicate that the transaction was committed or rolled back, then a commit or abort command may be included in the status inquiry response, as appropriate. If the transaction log and/or shared memory indicated that a commit or abort decision was still pending due to failure to receive a commit or abort response from certain participants, a query may be sent to those participants. If no record of the transaction is included in the transaction log, then a roll back command may be sent to all participants.

At block 385, the backup coordinator completes the distribute transaction. The method then ends.

Figure 4:
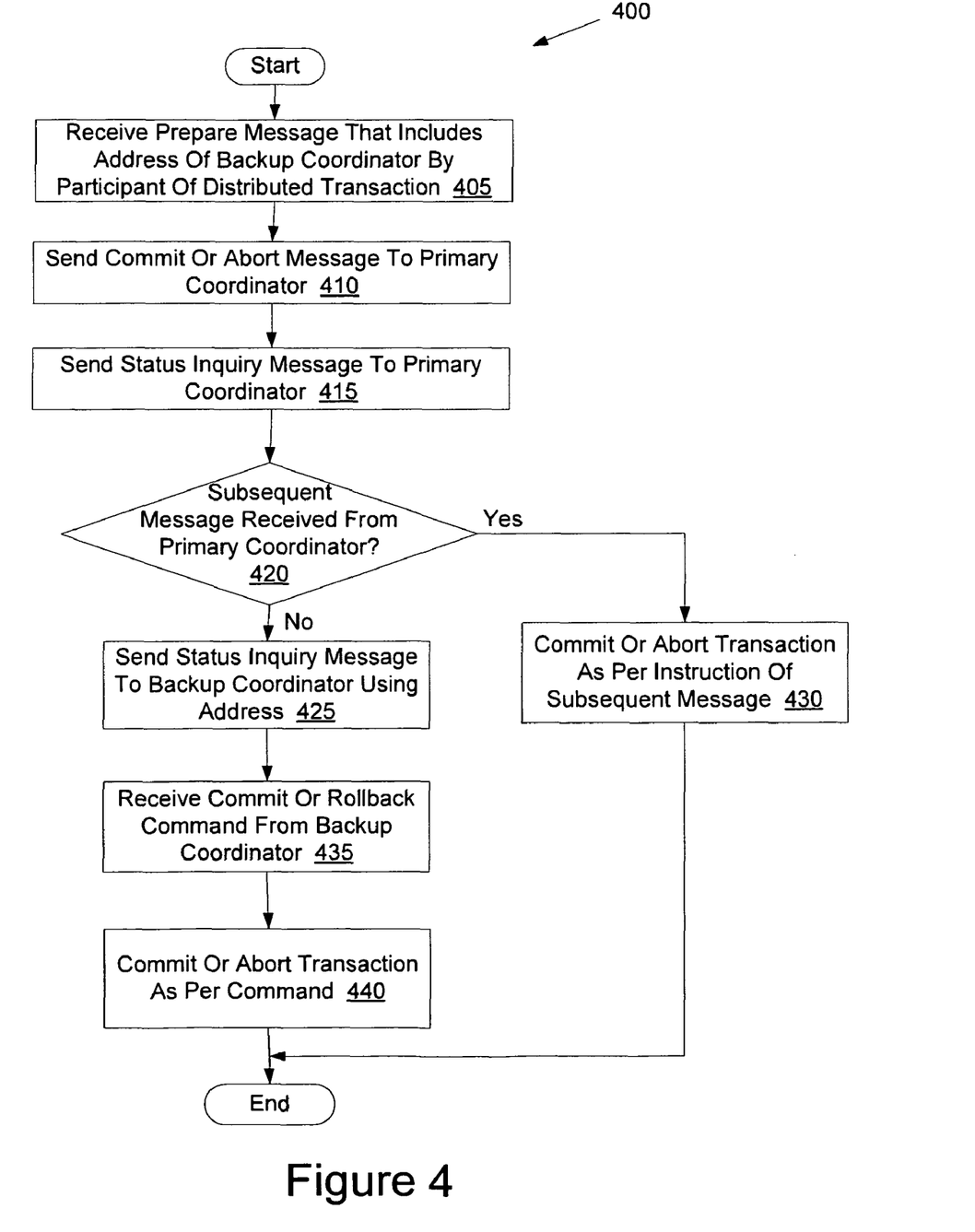
FIG. 4 illustrates a flow diagram of one embodiment for a method of participating in a distributed transaction.

FIG. 4 illustrates a flow diagram of one embodiment for a method 400 of participating in a distributed transaction. The method is performed by processing logic that comprises hardware (e.g., circuitry, dedicated logic, programmable logic, microcode, etc.), software (such as instructions run on a processing device), or a combination thereof. In one embodiment, method 400 is performed by a resource manager (e.g., first resource manager 115) or transaction manager (e.g., first transaction manager 120) of FIG. 1A.

Referring to FIG. 4, method 400 includes receiving a prepare message for a two-phase commit distributed transaction. The received prepare message includes an address of a backup coordinator. The distributed transaction is a transaction in which the recipient resource manager or transaction manager is a participant.

At block 410, the participant (resource manager or transaction manager) sends a commit or abort message to a primary coordinator from which the prepare message was received. The participant then expects to receive a commit or abort command from the primary coordinator.

At block 415, a status inquiry message is sent to the primary coordinator. The status inquiry message is sent if no message has been received from the primary coordinator in a predetermined time period. At block 420, the participant waits for a response to the status inquiry message from the primary coordinator. If no subsequent messages are received from the primary coordinator, the method proceeds to block 425. If a subsequent message is received from the primary coordinator, the method proceeds to block 430, and the participant commits or aborts the transaction as per an instruction included in the subsequent message.

At block 425, the participant sends a status inquiry message to the backup coordinator using the address that was included in the prepare message. At block 435, the participant receives a commit or roll-back command from the backup coordinator. The participant then commits or rolls back the transaction as appropriate.

Figure 5:
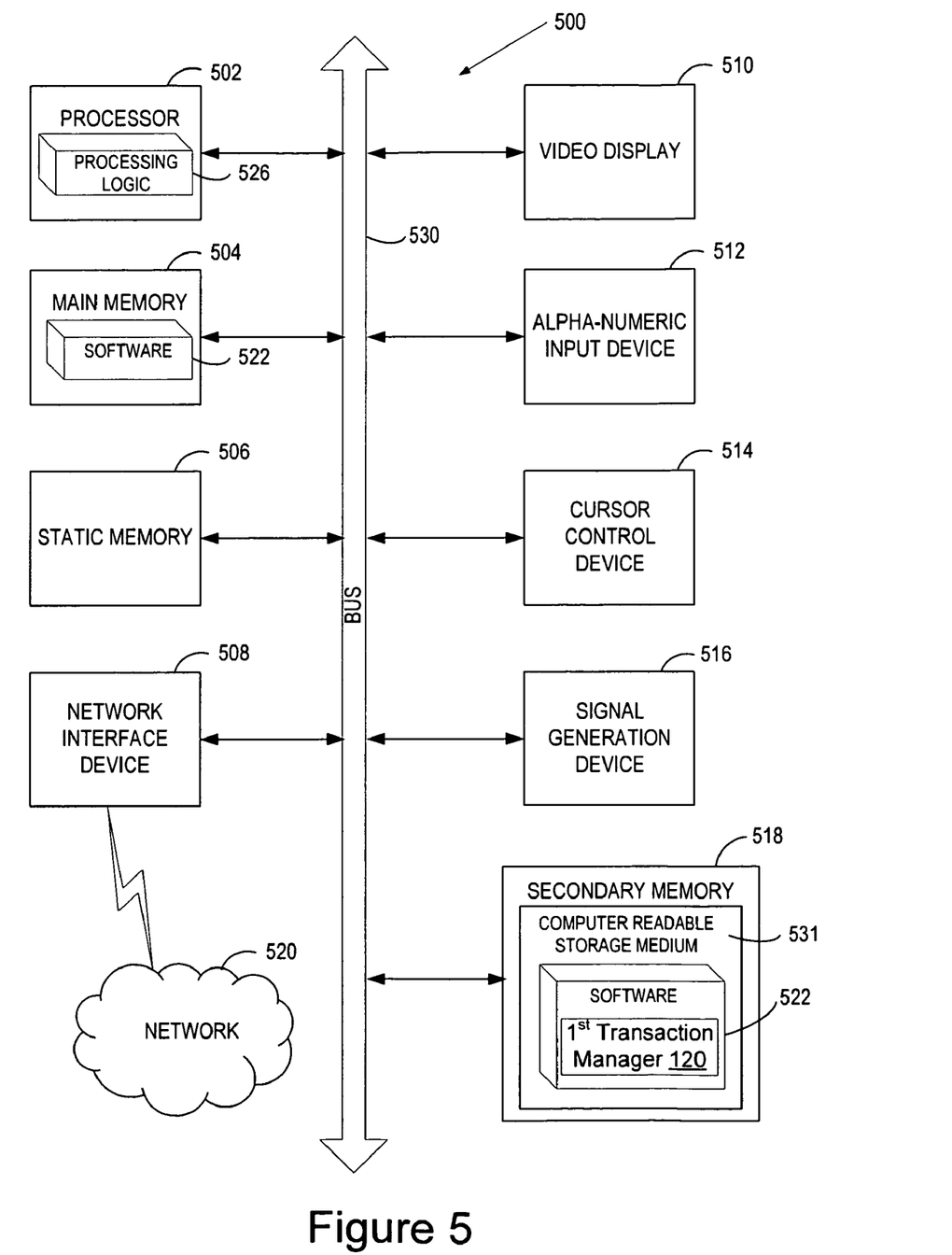
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store a transaction manager (e.g., first transaction manager 120 of FIG. 1A) or resource manager (e.g., first resource manager 115 of FIG. 1A), and/or a software library containing methods that call transaction managers or resource managers. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method comprising:
generating a prepare message for a two-phase commit distributed transaction by a primary coordinator, the prepare message including an address of a backup coordinator;
maintaining a transaction log of the distributed transaction, wherein the transaction log is accessible to both the primary coordinator and the backup coordinator;
sending the prepare message to a plurality of participants, wherein the address of the backup coordinator included in the prepare message enables the plurality of participants to send transaction status inquiries to the backup coordinator after failing to receive an expected message from the primary coordinator; and
failing over to the backup coordinator without interrupting the distributed transaction.

2. The method of claim 1, further comprising:
exchanging a heartbeat message between the primary coordinator and the backup coordinator; and
failing over to the backup coordinator if the primary coordinator fails to respond to the heartbeat message from the backup coordinator.

3. The method of claim 1, further comprising:
failing over to the backup coordinator upon receiving a transaction status inquiry by the backup coordinator from at least one of the plurality of participants; and
responding to the transaction status inquiry by the backup coordinator.

4. The method of claim 1, further comprising:
accessing the transaction log by the backup coordinator to determine a current status of the distributed transaction; and
completing the distributed transaction by the backup coordinator.

5. The method of claim 4, wherein the primary coordinator writes to the transaction log if a commit response is received from each of the plurality of participants, the method further comprising:
directing, by the backup coordinator, the plurality of participants to roll back the distributed transaction if there is no entry in the transaction log for said distributed transaction; and
directing, by the backup coordinator, the plurality of participants to commit the distributed transaction if there is an entry in the transaction log for said distributed transaction.

6. The method of claim 1, wherein the backup coordinator is remote from the primary coordinator.

7. A computer implemented method comprising:
receiving a prepare message by a participant of a two-phase commit distributed transaction from a primary coordinator of the distributed transaction, the prepare message including an address of a backup coordinator;
sending a commit or abort message to the primary coordinator;
sending a backup transaction status inquiry message to the backup coordinator using the address after failing to receive a subsequent message from the primary coordinator within a specified time period; and
receiving a commit or roll back message from the backup coordinator.

8. The method of claim 7, further comprising:
sending a primary transaction status inquiry message to the primary coordinator; and
timing out a timer before receiving a response to the primary transaction status inquiry message.

9. The method of claim 7, wherein the backup coordinator is remote from the primary coordinator.

10. A computer readable storage medium including instructions that, when executed by a processing system, cause the processing system to perform a method comprising:
generating a prepare message for a two-phase commit distributed transaction by a primary coordinator, the prepare message including an address of a backup coordinator;
maintaining a transaction log of the distributed transaction, wherein the transaction log is accessible to both the primary coordinator and the backup coordinator;

sending the prepare message to a plurality of participants, wherein the address of the backup coordinator included in the prepare message enables the plurality of participants to send transaction status inquiries to the backup coordinator after failing to receive an expected message from the primary coordinator; and failing over to the backup coordinator without interrupting the distributed transaction.

11. The computer readable storage medium of claim 10, the method further comprising:

exchanging a heartbeat message between the primary coordinator and the backup coordinator; and failing over to the backup coordinator if the primary coordinator fails to respond to the heartbeat message from the backup coordinator.

12. The computer readable storage medium of claim 10, the method further comprising:

failing over to the backup coordinator upon receiving a transaction status inquiry by the backup coordinator from at least one of the plurality of participants; and responding to the transaction status inquiry by the backup coordinator.

13. The computer readable storage medium of claim 10, the method further comprising:

accessing the transaction log by the backup coordinator to determine a current status of the distributed transaction; and completing the distributed transaction by the backup coordinator.

14. The computer readable storage medium of claim 13, wherein the primary coordinator writes to the transaction log if a commit response is received from each of the plurality of participants, the method further comprising:

directing, by the backup coordinator, the plurality of participants to roll back the distributed transaction if there is no entry in the transaction log for said distributed transaction; and directing, by the backup coordinator, the plurality of participants to commit the distributed transaction if there is an entry in the transaction log for said distributed transaction.

15. A computer readable storage medium including instructions that, when executed by a processing system, cause the processing system to perform a method comprising:

receiving a prepare message by a participant of a two-phase commit distributed transaction from a primary coordinator of the distributed transaction, the prepare message including an address of a backup coordinator;

sending a commit or abort message to the primary coordinator;

sending a backup transaction status inquiry message to the backup coordinator using the address after failing to receive a subsequent message from the primary coordinator within a specified time period; and receiving a commit or roll back message from the backup coordinator.

16. The computer readable storage medium of claim 15, the method further comprising:

sending a primary transaction status inquiry message to the primary coordinator; and timing out a timer before receiving a response to the primary transaction status inquiry message.

17. The computer readable storage medium of claim 15, wherein the backup coordinator is remote from the primary coordinator.

18. A distributed computing system comprising:

a data store;

a primary coordinator node to generate a prepare message for a two-phase commit distributed transaction, the prepare message including an address of a backup coordinator node, to maintain a transaction log of the distributed transaction in the data store, and to send the prepare message to a plurality of participant nodes, wherein the address of the backup coordinator included in the prepare message enables the plurality of participant nodes to send transaction status inquiry messages to the backup coordinator node after failing to receive an expected message from the primary coordinator node; and the backup coordinator node networked to the primary coordinator to, upon detecting a failure of the primary coordinator node, access the transaction log to determine a state of the distributed transaction and assume control of the distributed transaction.

19. The distributed computing system of claim 18, further comprising:

the backup coordinator node to periodically exchange a heartbeat message with the primary coordinator node, and to assume control of the distributed transaction if the primary coordinator node fails to respond to the heartbeat message.

20. The distributed computing system of claim 18, further comprising:

the primary coordinator node to write to the transaction log if a commit response is received from each of the plurality of participant nodes; and the backup coordinator node, after assuming control of the distributed transaction, to direct the plurality of participant nodes to roll back the distributed transaction if there is no entry in the transaction log for said distributed transaction, and to direct the plurality of participant nodes to commit the distributed transaction if there is an entry in the transaction log for said distributed transaction.

21. The distributed computing system of claim 18, further comprising:

a participant node, networked to the primary coordinator node and to the backup coordinator node, to receive the prepare message, to send a commit or abort message to the primary coordinator node, to send a primary transaction status inquiry message to the primary coordinator node upon failing to receive a subsequent message pertaining to the distributed transaction, and to send a backup transaction status inquiry message to the backup coordinator node using the address after failing to receive a response to the primary status inquiry message.

22. The distributed computing system of claim 21, further comprising:

the backup coordinator node to assume control of the distributed transaction upon receiving the backup transaction status inquiry message, and to respond to the backup transaction status inquiry message.

* * * * *